(12) United States Patent
Zipfel et al.

(10) Patent No.: US 10,900,406 B2
(45) Date of Patent: Jan. 26, 2021

(54) METHOD FOR THE PRODUCTION OF AN EXHAUST-GAS ROUTING DEVICE FOR A MOTOR VEHICLE

(71) Applicant: Faurecia Emissions Control Technologies, Germany GmbH, Augsburg (DE)

(72) Inventors: Toni Zipfel, Augsburg (DE); Manfred Stiglmair, Augsburg (DE); Claudia Herbers, Augsburg (DE)

(73) Assignee: Faurecia Emissions Control Technologies, Germany GmbH

( * ) Notice: Subject to any disclaimer, the term of this patent is extended or adjusted under 35 U.S.C. 154(b) by 170 days.

(21) Appl. No.: 16/371,472

(22) Filed: Apr. 1, 2019

(65) Prior Publication Data
US 2019/0301345 A1  Oct. 3, 2019

(30) Foreign Application Priority Data

Apr. 3, 2018 (DE) .................. 10 2018 107 836

(51) Int. Cl.
*F01N 13/10* (2010.01)
*F02B 37/02* (2006.01)
*F01N 13/18* (2010.01)

(52) U.S. Cl.
CPC ......... *F01N 13/10* (2013.01); *F01N 13/1888* (2013.01); *F02B 37/02* (2013.01); *B23P 2700/03* (2013.01); *F01N 2240/20* (2013.01); *Y10T 29/49345* (2015.01)

(58) Field of Classification Search
CPC .......... Y10T 29/49345; B23P 2700/03; F01N 3/2853; F01N 3/2871; G05B 13/041
See application file for complete search history.

(56) References Cited

U.S. PATENT DOCUMENTS

| 6,389,693 | B1 * | 5/2002 | Aranda | B01D 53/9454 |
| | | | | 29/890 |
| 6,769,281 | B2 * | 8/2004 | Irie | F01N 3/2853 |
| | | | | 29/890 |
| 7,451,660 | B2 * | 11/2008 | Martin | B23P 19/04 |
| | | | | 73/818 |

(Continued)

*Primary Examiner* — Jason L Vaughan
(74) *Attorney, Agent, or Firm* — Carlson, Gaskey & Olds, P.C.

(57) ABSTRACT

A method for production of an exhaust-gas routing device that has a housing, an elongated substrate, and a compensating element, includes the following steps. At least one parameter of the substrate and/or of the compensating element is determined A target parameter, which describes a variable linked to a target geometry of the housing, is determined based on the measured parameter of the substrate and/or of the compensating element. The substrate and the compensating element are arranged in the housing, and the housing is deformed with an overpressure factor which is determined on the basis of at least one previous deformation of a previously manufactured device. The housing is measured after the deformation, and the thus-established values are compared with the target parameter. An overpressure factor for the deformation of a subsequently manufactured device is adapted if a deviation from the target parameter is detected upon measuring which lies above a defined threshold value.

10 Claims, 3 Drawing Sheets

(56) References Cited

U.S. PATENT DOCUMENTS

| | | | |
|---|---|---|---|
| 8,146,251 B2 * | 4/2012 | Kobayashi | B23P 11/005 29/890 |
| 8,661,672 B2 * | 3/2014 | Cantele | F01N 3/0211 29/890 |
| 2006/0272153 A1 * | 12/2006 | Bowman | F01N 3/2853 29/890 |
| 2008/0263866 A1 * | 10/2008 | Mayfield | F01N 3/0211 29/890 |
| 2009/0113709 A1 * | 5/2009 | Mueller | F01N 3/2853 29/890 |
| 2010/0275443 A1 | 11/2010 | Kroner et al. | |
| 2011/0171079 A1 * | 7/2011 | Garcia Gomez | F01N 3/2842 422/168 |
| 2012/0121474 A1 | 5/2012 | Wirth | |

\* cited by examiner

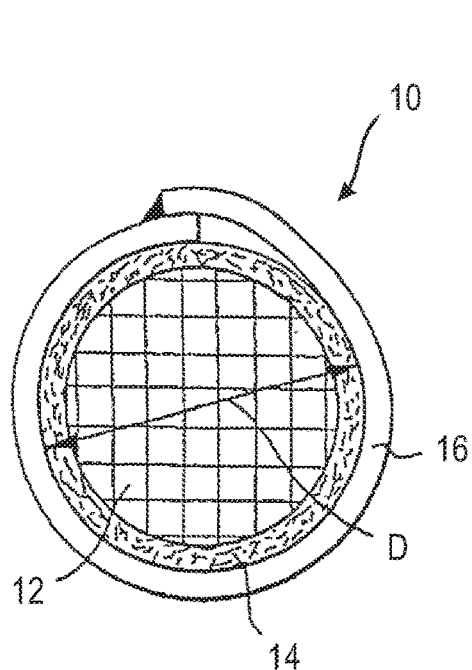
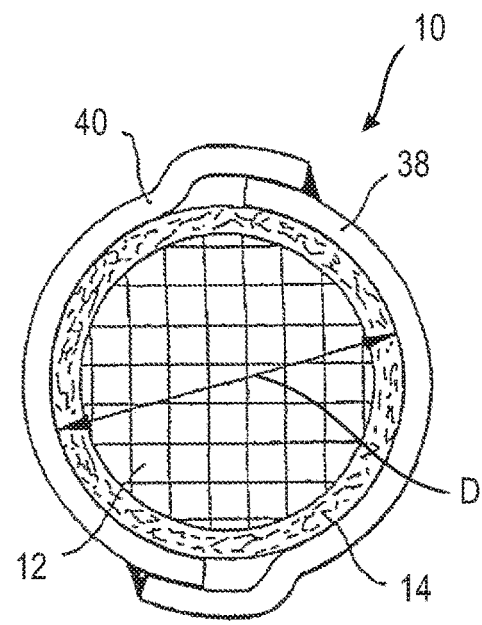
Fig. 3    Fig. 4
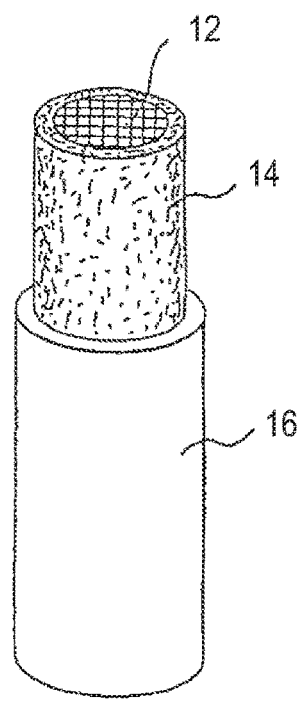
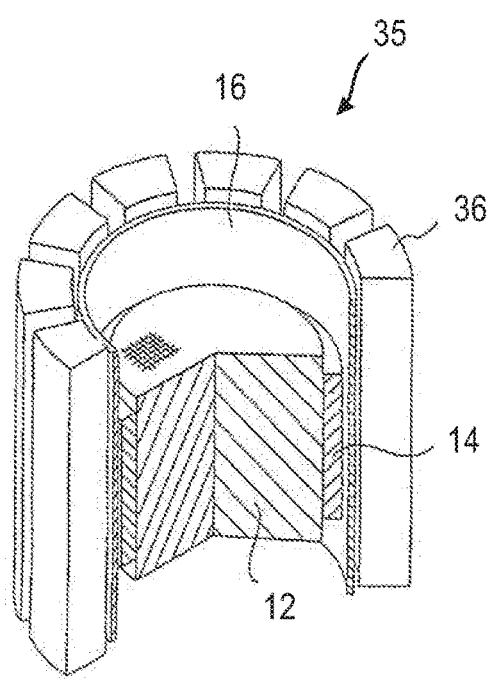
Fig. 5    Fig. 6

METHOD FOR THE PRODUCTION OF AN EXHAUST-GAS ROUTING DEVICE FOR A MOTOR VEHICLE

CROSS-REFERENCE TO RELATED APPLICATIONS

This application is a U.S. non-provisional application claiming the benefit of German Patent Application No. 10 2018 107 836.6, filed on Apr. 3, 2018, which is incorporated herein by its entirety.

FIELD OF INVENTION

The invention relates to a method for the production of an exhaust-gas routing device for a motor vehicle, which has an external housing with an inlay clamped therein, wherein the inlay comprises a substrate through which exhaust gas flows and an elastic compensating element surrounding the substrate. The exhaust-gas routing device is, for example, a silencer, but in particular an emission control device such as a catalytic converter or a particle filter.

BACKGROUND OF THE INVENTION

Inlays very sensitive to radial pressure are housed in exhaust-gas routing devices. These are predominantly ceramic substrates with axial through-flow and which are wrapped in an elastic compensating element, for example in the form of a mat. If possible, these inlays are held in axial and radial directions only by radial clamping in the external housing. On the one hand, the clamping force must be great enough to ensure that there is no relative axial shift between the inlay and external housing during vehicle operation as a result of gas pressure or vibrations. On the other hand, naturally the radial pressure cannot be so high that it results in the destruction of the inlay, in particular the destruction of the pressure-sensitive catalytic converter or particle-filter substrate.

The insertion and clamping of the inlay in the external housing is effected, for example, by inserting the inlay into a tube and then subsequently pressing the tube in (so-called shrinking). Another known method is to insert the inlay into a tube of a matching diameter (so-called stuffing).

A further difficulty in this connection is the fact that the external housing, in particular the tube, after the introduction and clamping of the inlay, can spring back, which can in turn result in a decrease of a pressure initially applied to the substrate, and thus also in the clamping force.

A method for the production of an exhaust-gas routing device for a motor vehicle, should be particularly reliable and have a specified clamping force between an inlay and an external housing that is as constant as possible.

SUMMARY OF THE INVENTION

A method for the production of an exhaust-gas routing device for an internal combustion engine, the exhaust-gas routing device having a housing, an elongated substrate, and a compensating element, and the method comprising the following steps:

determining at least one parameter of the substrate and/or of the compensating element, determining a target parameter, which describes a variable linked to a target geometry of the housing, based on the measured parameter of the substrate and/or of the compensating element, arranging the substrate and the compensating element in the housing, deforming the housing with an overpressure factor which is determined on the basis of at least one previous deformation of a previously manufactured device, measuring the housing after the deformation, and comparing the established values with the target parameter, and adapting an overpressure factor for the deformation of a subsequently manufactured device if a deviation from the target parameter is detected upon measuring which lies above a defined threshold value.

This method has the advantage that a particularly reliable clamping is achieved and at the same time damage to the substrate is avoided.

This is achieved on one hand by the target geometry for each exhaust-gas routing device being determined individually on the basis of the at least one parameter measured in step a). In this way, tolerances of the substrate and/or of the compensating element can be taken into account in the production process.

As a result of the initial measuring of components of the inlay, as well as the additional measuring of the housing after the insertion of the inlay, deviations in the housing geometry, after the deformation, from the sought result which is described by the target parameter can be identified immediately.

Because of the deviations from the desired target geometry occurring in the currently manufactured device, according to the invention the manufacturing parameters, in particular the overpressure factor, for the deformation of the housing of the devices manufactured thereafter are altered as required. This process is carried out continuously with the result that the overpressure factor is always based on current data which follow in particular from ongoing production.

The threshold value can be chosen as small as required and in particular also set to zero, with the result that in principle every deviation from the ideal deformation can be corrected instantly, and if possible the manufacturing process always runs with the optimum parameters.

The overpressure factor is a correction factor by which the housing is deformed beyond the desired geometry in order to compensate for a springing back of the material, in particular of the housing, and thus to avoid a deviation.

The target parameter can be, e.g., a diameter or a circumference of the housing. However, it is also possible to define the target parameter abstractly as a variable which results from one or more measured values in a suitable manner describing the geometry of the housing. For example, the measured values of several measuring points on the external contour of the housing could be incorporated. A space-resolved approach would also be conceivable if appropriate.

In possible variants, it is ascertained by comparing a measured external diameter or external circumference of the housing with a target diameter or target circumference whether the overpressure factor applied is sufficient to compensate for a springing back of the housing.

The deformation can be both a pressing-in and a widening. The method is suitable both for a fixing of the inlay in the housing by shrinking and for a fixing by stuffing. If the fixing is achieved by shrinking, the inlay is placed into the housing before deformation of same. If the fixing is effected by stuffing, the inlay is inserted into the housing after deformation of same. Accordingly, the method steps c) and d) are carried out in the stated sequence in the case of shrinking and in reverse sequence in the case of stuffing. The principle of the invention is the same in both cases.

The overpressure factor is adapted according to the invention if it is detected upon measuring after the deformation of the housing that the deviation from the target parameter lies above a pre-set threshold value. In this way there are almost no further rejects during production due to an incorrect external diameter. The very next subsequently manufactured exhaust-gas routing device can be manufactured taking into account the optimized overpressure factor.

The deviation from the target parameter, which is compared with the threshold value, can be obtained from the individual directly preceding deformation process, but it is of course also possible to use suitable statistical methods and, for example, to average the established results of the last successive deformation processes or also to use other known methods of error handling to establish the deviation and the adaptation of the overpressure factor. For example, an average of the deviations from the target parameter from the last five deformation processes can be used in order to specify a deviation.

The threshold value above which the overpressure factor is adapted should still lie within tolerance limits above which the manufactured device must be rejected. This means that even if the deviation from the target parameter still lies within a tolerance range, it is already counteracted by adaptation of the overpressure factor in order to prevent a deviation from exceeding the tolerance limits from the outset. The method according to the invention thus enables a particularly reliable manufacturing.

According to a preferred embodiment, a check is carried out before the adaptation of the overpressure factor whether the overpressure factor lies within a tolerance range. This likewise contributes to a low reject rate. If, for example, a calculated overpressure factor would have the result that, although the target parameter is reached, the overpressure factor is so great that it would result in damage to the substrate during pressing in, the overpressure factor is subsequently corrected and thus a greater deviation from the target parameter allowed. Of course, the target parameter achieved in this way must still lie within the tolerance limits for the target parameter, so that a sufficient clamping force is achieved. Moreover, in this way the production machine as well as the tool can be protected against excess wear or damage.

A control loop feedback is preferably used in order to adapt the overpressure factor. Here, suitable statistical methods can also be used to evaluate the detected deviations of several preceding deformation processes in order to adapt the overpressure factor. Thus an adaptation of the overpressure factor can be introduced into a production line particularly quickly and without an interruption in production being necessary, such that the corrected overpressure factor is already applied in a subsequently manufactured device.

The parameters determined in step a) can comprise a weight of the substrate and/or of the compensating element and/or a geometric measurement of the substrate and/or of the compensating element. Alternatively or additionally, a compressibility of the compensating element can be determined. At least one of these parameters can be incorporated into the calculation of the optimum housing geometry, in particular into the calculation of the target diameter.

The housing is preferably tubular. With a tubular housing, a pressure can be distributed particularly uniformly on a circumference of the substrate. In this respect, a tube with a circular cross section is most suitable. However, tubes with other cross sections can also be used, for example tubes with oval, elliptical, square or hexagonal cross section or similar. In addition, it is also possible to assemble the housing from several shells. Alternatively, the housing can be wound. The housing is in particular a sheet metal casing. The cross-sectional shape of the housing after the deformation can deviate from the cross-sectional shape of the housing before the deformation.

The elongated substrate is preferably at least substantially cylindrical, wherein, in addition to circular cross sections, oval, elliptical or polygonal cross sections can also be favourable. The cross-sectional shape of the substrate can deviate from that of the housing before the deformation.

The shape of the substrate often deviates from an ideal cylinder shape. This can be for one thing due to tolerances, for another however for example a slight barrel shape in which the substrate has a slight thickening in the centre of its longitudinal extent, or a slight frustoconical shape, have proved beneficial as favourable substrate geometries.

The compensating element can be placed around the substrate before it is inserted into the housing. This facilitates the insertion of the inlay, which is formed by the compensating element and the substrate, into the housing. The compensating element is preferably a support mat. In particular the compensating element is elastic.

According to an embodiment of the process, for deformation the housing is positioned in a tool which has several radially movable jaws. Through the jaws, a uniform pressure can be applied to the housing along a circumference of the housing, as a result of which the housing is deformed, in particular such that the calculated target parameter is achieved.

The jaws can be moved by an individual adjustment distance depending on the target parameter and on the overpressure factor. This has the advantage that the adjustment distance can be varied in order to achieve an optimum clamping between housing and substrate. In particular, the adjustment distance can be set individually for each device to be manufactured.

BRIEF DESCRIPTION OF THE DRAWINGS

Further advantages and features of the invention follow from the description below and from the drawings to which reference is made. In the drawings.

FIG. 3 shows a cross section through a device produced according to the invention, wherein the external housing is wound;

FIG. 4 shows a cross section through a device produced according to the invention, wherein the external housing is constructed from shells;

FIG. 5 shows a schematic diagram which shows the stuffing used as an alternative in the process according to the invention; and FIG. 6 shows a perspective view of a tool used in the process according to the invention, partially in section.

DETAILED DESCRIPTION

Figure 1:
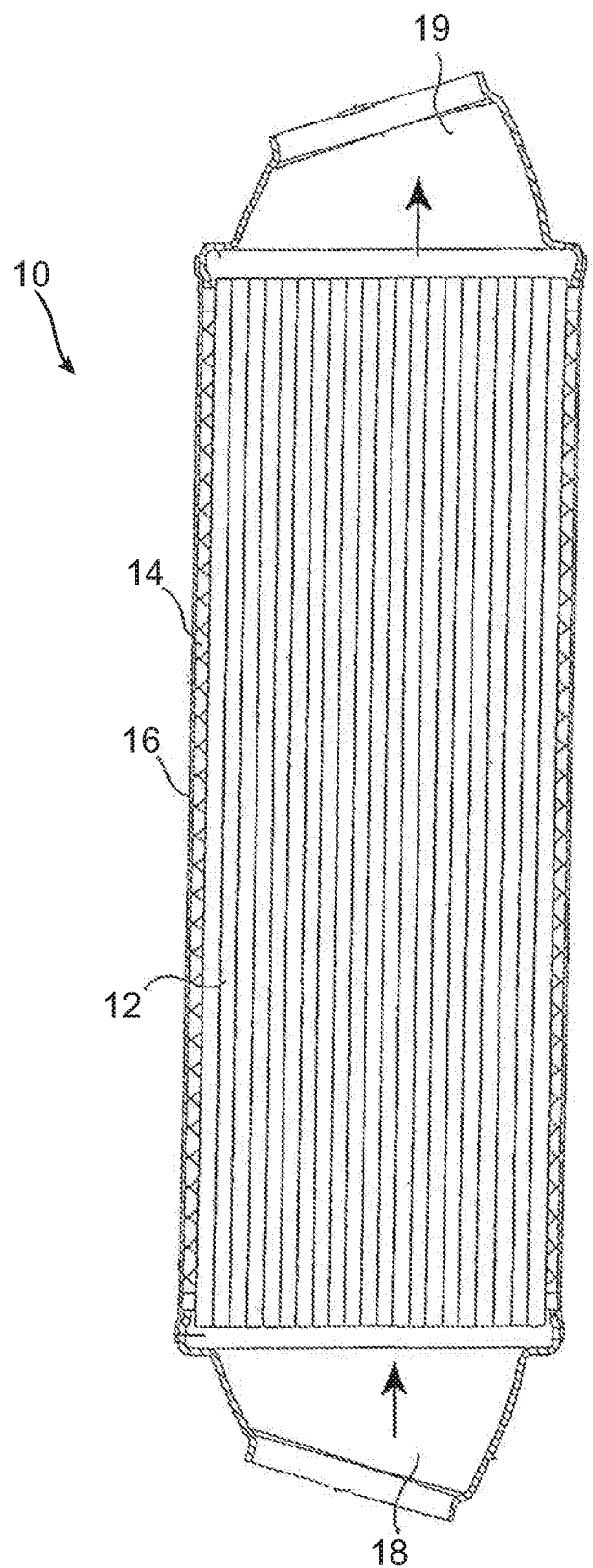
FIG. 1 shows a longitudinal section through an emission control device produced according to the invention.

FIG. 1 shows an exhaust-gas routing device 10, in particular an emission control device. Such devices are usually installed in motor vehicles, but other applications would also be conceivable. The emission control device can be either a catalytic converter, a particle filter or a combination of both.

The exhaust-gas routing device comprises an elongated, here a substantially cylindrical, substrate 12 which comprises, for example, a ceramic or metallic substrate. For example, the substrate 12 is of a corrugated-board-type support structure which is coated with catalyst material.

The substrate 12 can have a circular cylindrical cross section or any non-circular cross section, e.g. an oval cross section. A circular cylindrical cross section is shown in the figures purely for simplified representation.

The substrate 12 is surrounded by an elastic compensating element 14 which is formed as a support mat. The compensating element 14 is arranged between the substrate 12 and a housing 16.

The housing 16 is designed with very thin walls, in particular made of sheet metal. An inflow funnel 18 and an outflow funnel 19 are connected upstream and downstream respectively to the housing 16.

The substrate 12 together with the compensating element 14 forms a unit which is also called an inlay in the following.

During operation, exhaust gas flows into the substrate 12 via the end face of the inflow funnel 18 and finally leaves the substrate 12 containing fewer pollutants at the opposite end face in order to leave the exhaust-gas routing device 10 via the outflow funnel 19.

The process according to the invention for the production of the exhaust-gas routing device 10 is explained in more detail in the following with reference to FIG. 2.

Figure 2:
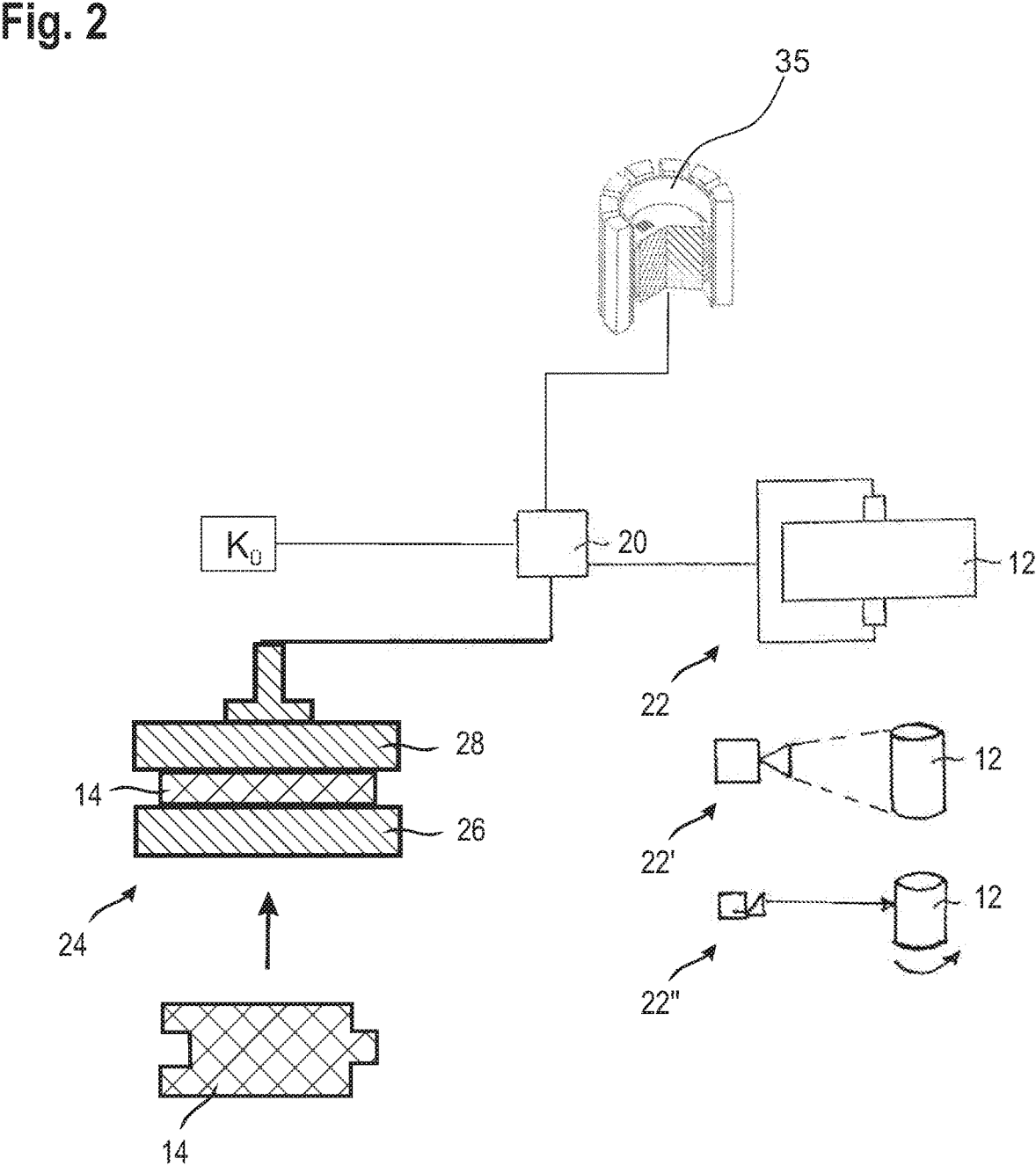
FIG. 2 shows schematic diagrams of measurement devices and tools which are used in the process according to the invention.

In FIG. 2 various measuring stations are shown with which various parameters of each individual substrate 12 and each compensating element 14 are established with respect to achieving an optimum clamping force of the inlay in the housing 16. The measuring stations are coupled via a control unit 20 to a tool 35 for mounting and clamping of the inlay in the housing 16. The stations explained in the following are described in the preferred sequence of the production process.

At least one parameter of the substrate 12 is determined individually in a measuring device 22. According to FIG. 2, this parameter is the external geometry (shape and external dimensions, in particular circumference) of the substrate 12, which is preferably established by contact-free measuring sensors.

The measuring can be restricted to a single position on the substrate 12, but it would also be conceivable to measure the substrate 12 at several positions.

Alternatively or additionally, a weight of the substrate 12 can also be determined. It is also conceivable, alternatively or additionally to the absolute values, to record a deviation from a pre-set theoretical value, i.e. to measure the substrate 12 and/or the elastic compensating element 14 relative to the theoretical value.

A CCD camera 22' or a laser measuring device 22" can also be used to determine the external geometry.

Furthermore, different parameters of the compensating element 14 can be determined, for example a weight, a geometry, and/or a compressibility of the compensating element 14.

The measuring device 22 is connected to the control unit 20 in which the obtained measurement values for the substrate 12 and/or the compensating element 14 are stored.

As shown in FIG. 2, in a tension-compression testing machine 24 each individual compensating element 14, i.e. each support mat, is laid flat on a level base 26 and is deformed substantially perpendicular to the base 26 by exertion of a pressure p, wherein the whole compensating element is loaded over its whole surface and the compressibility thus determined.

With the established data on the inlay to be installed, comprising the substrate 12 and the compensating element 14, a target geometry of the external housing 16 matched at least to the compressibility of the compensating element 14 and the geometry of the substrate 12 can be established in the control unit 20, which can be effected by calculation or by comparison with a distribution matrix stored in the control unit 20. The individual target geometry is designed based on the achievement of the required clamping force to be exerted on and matched individually to the inlay.

A variable linked to the target geometry is specified as a target parameter. A variable directly describing the geometry of the housing 16 is chosen as the target parameter but, for example, a statistical value which is established from several measurement points on the housing 16 could also be used. A relative measured variable which is based on a theoretical value could likewise be used as target parameter.

In particular a target diameter or a target circumference of the housing 16 based on the measured parameters of the substrate 12 and/or of the compensating element 14 is determined as target parameter. The target diameter is then the diameter of the housing 16 for which a clamping force which acts on the inlay is optimum.

The inlay is then arranged in a housing 16. For this purpose, the housing 16 can be wound around the inlay, as shown in FIG. 3.

Alternatively, two or more shells 38, 40 can be inserted into one another in order to form the housing 16, as shown in FIG. 4.

In a subsequent process step the housing 16 is deformed, in this case pressed in. During deformation, a so-called overpressure factor $K_Ü$ which is determined on the basis of at least one previous deformation of a previously manufactured device is taken into consideration. This means that the housing 16 is deformed e.g. beyond the target diameter. Thus despite a springing back of the housing 16 at least approximately the target diameter can be reached.

FIG. 6 shows a tool 35 with which the housing 16 is deformed. The tool 35 has several circular segment-shaped jaws 36 which can be moved inwards. The insides of the jaws 36 are adapted to the later shape of the housing 16 in the corresponding range.

The jaws 36 can be moved inwards by an individual adjustment distance, with the result that an adjustment distance can be adapted to the desired target parameter and the overpressure factor $K_Ü$ can simultaneously be taken into consideration.

According to the process according to the invention, the housing 16 is measured after the deformation and a variable corresponding to the target parameter established which is compared with the previously specified value of the target parameter, i.e. for example the external diameter of the housing 16. If the deviation established in suitable manner lies above a threshold value, the overpressure factor $K_Ü$ is adapted, in particular via a control loop feedback. For example the deviations of the most recently manufactured devices, for example, the last five devices, are taken into consideration. This is carried out e.g. by averaging.

The adjusted overpressure factor $K_Ü$ is respectively taken into account for the device manufactured subsequently. This means that no repeated deformation of the same device occurs.

As an alternative to pressing in, a prefabricated housing 16 is widened before the inlay in inserted, as is indicated schematically in FIG. 5. This process is also called stuffing.

As described above, the substrate 12 and the compensating element 14 are measured and the target parameters specified.

According to the current overpressure factor $K_{\ddot{U}}$ the housing 16 is deformed, in this case widened, in a suitable tool. The tool can be constructed similar to the tool 35 shown in FIG. 6, wherein the jaws are arranged to be movable radially outward.

The inlay is then inserted into the housing 16. Here, there can be a further slight deformation of the housing 16, in particular if the inlay has a non-circular cross section.

As described above, the housing 16 is then measured and a deviation of the thus-established values from the target parameter established, following which the overpressure factor $K_{\ddot{U}}$ is adapted, if necessary.

The threshold value above which the overpressure factor $K_{\ddot{U}}$ is adapted lies within tolerance limits above which a manufactured device must be rejected. Moreover, a check is carried out before adaptation of the overpressure factor $K_{\ddot{U}}$ whether the overpressure factor also lies within a pre-set tolerance range. In this way, the manufacture of the exhaust-gas routing device is particularly reliable. In particular, the production of reject parts can be very largely avoided.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method for production of an exhaust-gas routing device for an internal combustion engine, wherein the exhaust-gas routing device includes a housing, an elongated substrate and a compensating element, the method comprising the following steps:
   a) determining at least one parameter of the elongated substrate and/or of the compensating element,
   b) determining a target parameter, which describes a variable linked to a target geometry of the housing, based on a measured parameter of the elongated substrate and/or of the compensating element,
   c) arranging the elongated substrate and the compensating element in the housing,
   d) deforming the housing with an overpressure factor which is determined on a basis of at least one previous deformation of a previously manufactured exhaust-gas routing device,
   e) measuring the housing after deformation, and comparing established values with the target parameter, and
   f) adapting an overpressure factor for a deformation of a subsequently manufactured exhaust-gas routing device if a deviation from the target parameter is detected upon measuring which lies above a defined threshold value.

2. The method of claim 1 wherein the deformation is a pressing-in or a widening.

3. The method of claim 1 wherein the target parameter is a diameter of the housing, a circumference of the housing, and/or a deviation from a pre-set value.

4. The method of claim 1 wherein the threshold value above which the overpressure factor is adapted lies within tolerance limits above which a manufactured exhaust-gas routing device must be rejected.

5. The method of claim 1 wherein a control loop feedback is used in order to adapt the overpressure factor.

6. The method of claim 1 wherein the parameters determined in step a) can comprise a weight of the elongated substrate and/or of the compensating element and/or a geometric measurement of the elongated substrate and/or of the compensating element.

7. The method of claim 1 wherein the housing is tubular.

8. The method of claim 1 wherein the compensating element is placed around the elongated substrate before being introduced into the housing.

9. The method of claim 1 wherein for deformation the housing is positioned in a tool which has several radially movable jaws.

10. The method of claim 9 wherein the radially movable jaws are moved radially by an individual adjustment distance depending on a size of the target parameter and the overpressure factor.

* * * * *